March 8, 1932.   J. P. GREGG   1,848,345
PLANT PROTECTOR
Filed Feb. 24, 1931
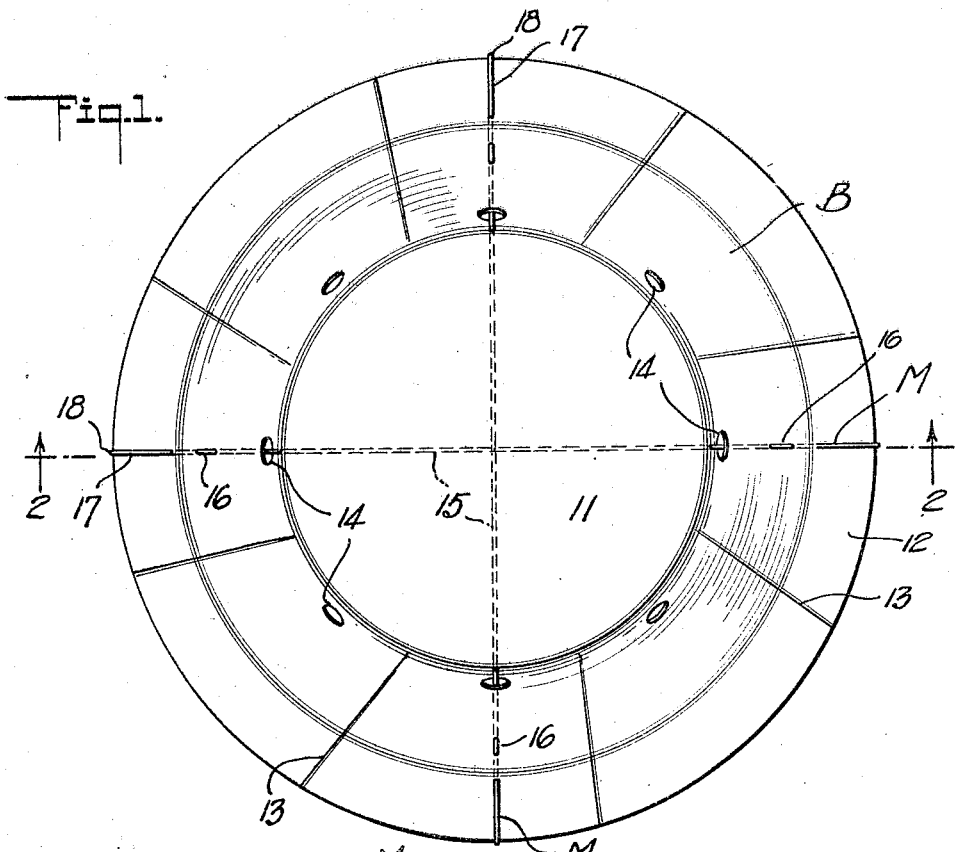
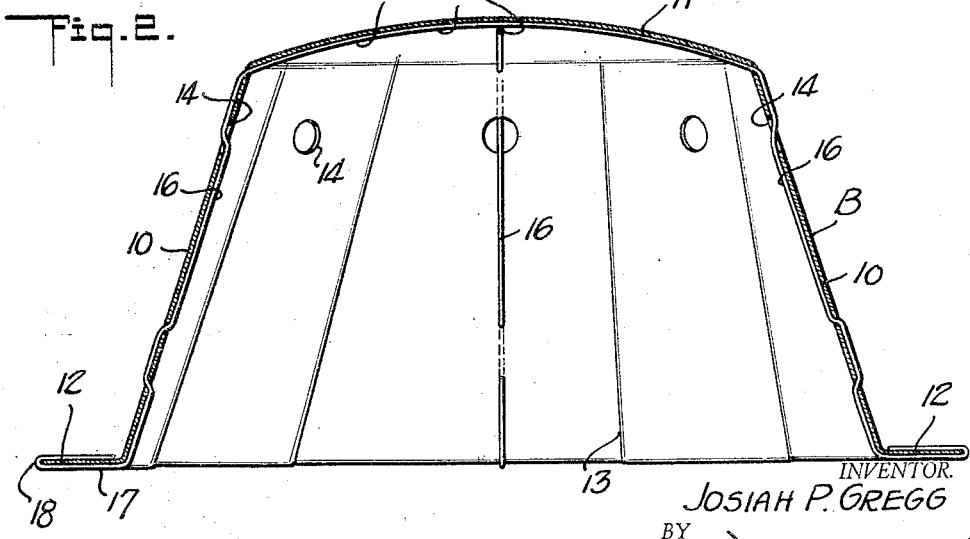
INVENTOR.
JOSIAH P. GREGG
BY
ATTORNEYS.

Patented Mar. 8, 1932

1,848,345

UNITED STATES PATENT OFFICE

JOSIAH P. GREGG, OF REDLANDS, CALIFORNIA

PLANT PROTECTOR

Application filed February 24, 1931. Serial No. 517,936.

My invention relates to and has for its purpose the provision of an article of manufacture characterized by its simple, substantial and inexpensive construction, and by which young and delicate plants can be effectively enclosed and protected against damage by storms and frost, all while insuring an adequate circulation of air to the plant and admitting a requisite amount of light thereto for the plant to become hardy and capable of proper growth when the protector is finally removed.

I will describe only one form of plant protector embodying my invention, and will then point out the novel features thereof in claims.

In the accompanying drawings:

Figure 1 is a view showing in plan, one form of plant protector embodying my invention, and Figure 2 is an enlarged vertical sectional view taken on the line 2—2 of Figure 1 and looking in the direction of the arrows.

Referring specifically to the drawings in which similar reference characters designate similar parts in each of the several views, my invention in its present embodiment comprises a sheet of waxed paper or other suitable inexpensive material capable of transmitting light, which is formed into a body B of cup shape so that the body when inverted can be placed upon the ground to enclose a plant. The side walls 10 of the body are inclined towards its closed end or domed top wall 11 so that the body is frusto-conical in form; and from the lower or open end of the body projects outwardly therefrom a base flange 12 which in the applied position of the protector, is covered with soil to prevent displacement of the protector from the plant.

As a result of forming the body from sheet material, its side walls and base flange are provided with tucks 13 at spaced locations circumferentially, which serve to stiffen the material. The side walls are provided adjacent the top wall 11 and intermediate the tucks 13, with ventilating openings 14 to permit the circulation of air to the enclosed plant and thus prevent internal sweating of the body with the consequent freezing of the moisture during a period of low temperatures which would result in killing the plant.

The material of the body is reinforced against collapsing by the provison of a plurality of reinforcing members M of which two are shown in the present instance, and each constructed from a length of bendable wire. A portion 15 of each member M extends diametrically across the top wall 11 of the body interiorly thereof and is in intersection relation at a right angle to the corresponding portion of the other member. From the portions 15 of each member, the wire is bent to provide portions 16 which extend along the side walls 10 of the body intermediate the tucks 13, and are threaded back and forth through the material of the body as shown in Figure 2 to prevent displacement of the members circumferentially of the body.

From the portions 16 of each member extend other portions 17 radially outward of the body across one side of the base flange 12; and the portions 17 are bent around the free edge of the flange as indicated at 18 so as to also extend radially inward of the body across the opposite side of the base flange to thus effectively prevent the flange from becoming buckled or otherwise deformed under the weight of soil placed upon the flange when the protector is applied to a plant. The walls of the body and the flange will thus be thoroughly reinforced to insure that during heavy storms the protector will retain its original form and remain undamaged so as to afford maximum protection to the plant.

It is to be noted that in the event of deterioration of the material of the flange by alkali contained in certain soils, that the portions 18 of the reinforcing members surrounding the flange will remain imbedded in the soil previously placed upon the flange, and will serve to anchor the protector against displacement even though the action of the alkali has rotted or entirely destroyed the material of the flange.

Although I have herein shown and described only one form of plant protector embodying my invention, it is to be understood that various changes and modifications may be made therein without departing from the spirit of the invention and the spirit and scope of the appended claims.

I claim:

1. A plant protector comprising a sheet material body of cup shape having an outwardly projecting base flange at its open end adapted to be embedded in the soil, and bendable metallic reinforcing members in the body having portions spanning the closed end of the body in intersecting relation, other portions extending from the first portions along the sides of the body, and other portions extending from the last portions across one side of the base flange and being bent about the free edge of the base flange to extend across the opposite side of the latter to prevent deformation of the flange and anchor the body to the ground in the event that the flange should deteriorate.

2. A plant protector comprising a sheet material body of cup shape having an outwardly projecting base flange at its open end, and stiffening folds extending along its sides and across the base flange, and reinforcing members in the body having portions spanning the closed end of the body, other portions extending from the first portions along the sides of the body intermediate the folds, and other portions extending from the last portions about the base flange to reinforce the material of the body against collapsing.

3. A plant protector comprising a sheet material body of cup shape having an outwardly projecting flange at its open end, and reinforcing wires in the body having radial portions spanning the closed end of the body in intersecting relation, other portions extending from the first portions along the sides of the body, and other radially extending portions extending from the last portions and bent about the free edge of the base flange.

JOSIAH P. GREGG.